United States Patent
Mogi et al.

[11] Patent Number: 5,900,536
[45] Date of Patent: May 4, 1999

[54] DEVICE FOR DETECTING KNOCKING OF AN INTERNAL COMBUSTION ENGINE

[75] Inventors: Kazuhisa Mogi; Koichi Nakata, both of Susono; Yoichi Kurebayashi, Toyohashi, all of Japan

[73] Assignee: Toyota Jidosha Kabushiki Kaisha, Aichi-ken, Japan

[21] Appl. No.: 08/922,400

[22] Filed: Sep. 3, 1997

[30] Foreign Application Priority Data

Sep. 4, 1996 [JP] Japan ................................. 8-234098

[51] Int. Cl.$^6$ ................................................. G01L 23/22
[52] U.S. Cl. ....................................... 73/35.08; 73/35.03
[58] Field of Search ............................. 73/35.08, 35.03, 73/35.04, 35.01; 324/399

[56] References Cited

U.S. PATENT DOCUMENTS

| | | | |
|---|---|---|---|
| 4,444,172 | 4/1984 | Sellmaier et al. | 73/35.08 |
| 5,781,012 | 7/1998 | Yasuda | 324/399 |

FOREIGN PATENT DOCUMENTS 61-57830 3/1986 Japan.

Primary Examiner—John E. Chapman
Attorney, Agent, or Firm—Kenyon & Kenyon

[57] ABSTRACT

A device for detecting knocking in an internal combustion engine which, when spike noise or noise due to disturbance in the flame in low-load running are generated, does not erroneously detect it as knocking. Knocking frequency components passing through a band-pass filter 32 and frequency components lower than the knocking frequency and passing through a low-load noise band-pass filter 321 are picked from the ionic current detected by an ionic current detecting unit 17. When the level of the low-frequency components is larger than a predetermined value, it is regarded that the noise is generated due to unstable combustion during the low-load operation or the spike noise is generated due to corona discharge of a spark plug 16, and the determination of the occurrence of knocking is prevented. This constitution makes it possible to prevent erroneous detection of knocking.

5 Claims, 9 Drawing Sheets

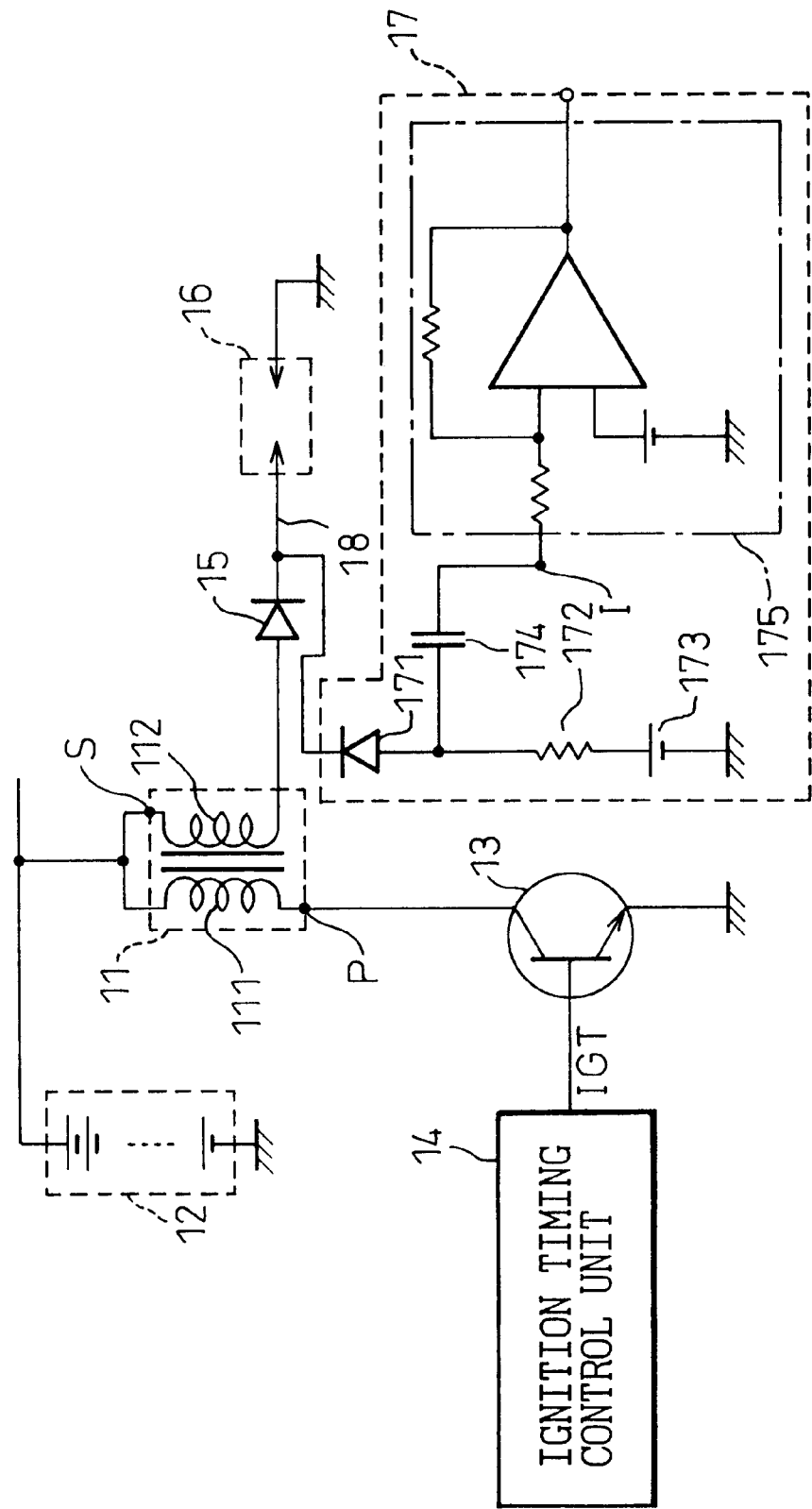

IGNITION SIGNAL
IGT

PRIMARY COIL
POINT P VOLTAGE

SECONDARY COIL
POINT S VOLTAGE

ION CURRENT
DETECTOR INPUT
VOLTAGE

KNOCKING
WINDOW $t_1$  $t_2$  $t_3$ $t_4$  $t_5$ $t_6$

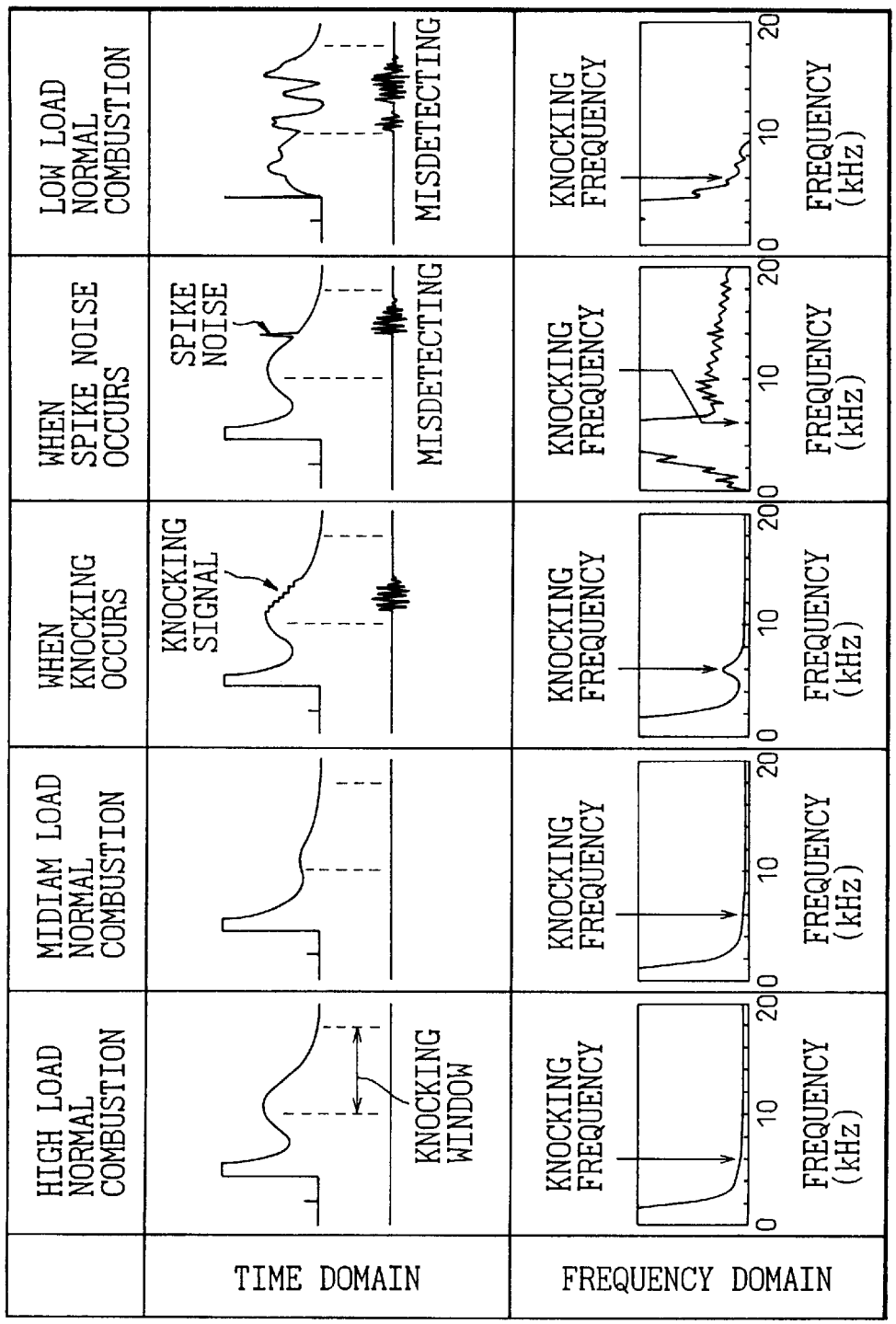

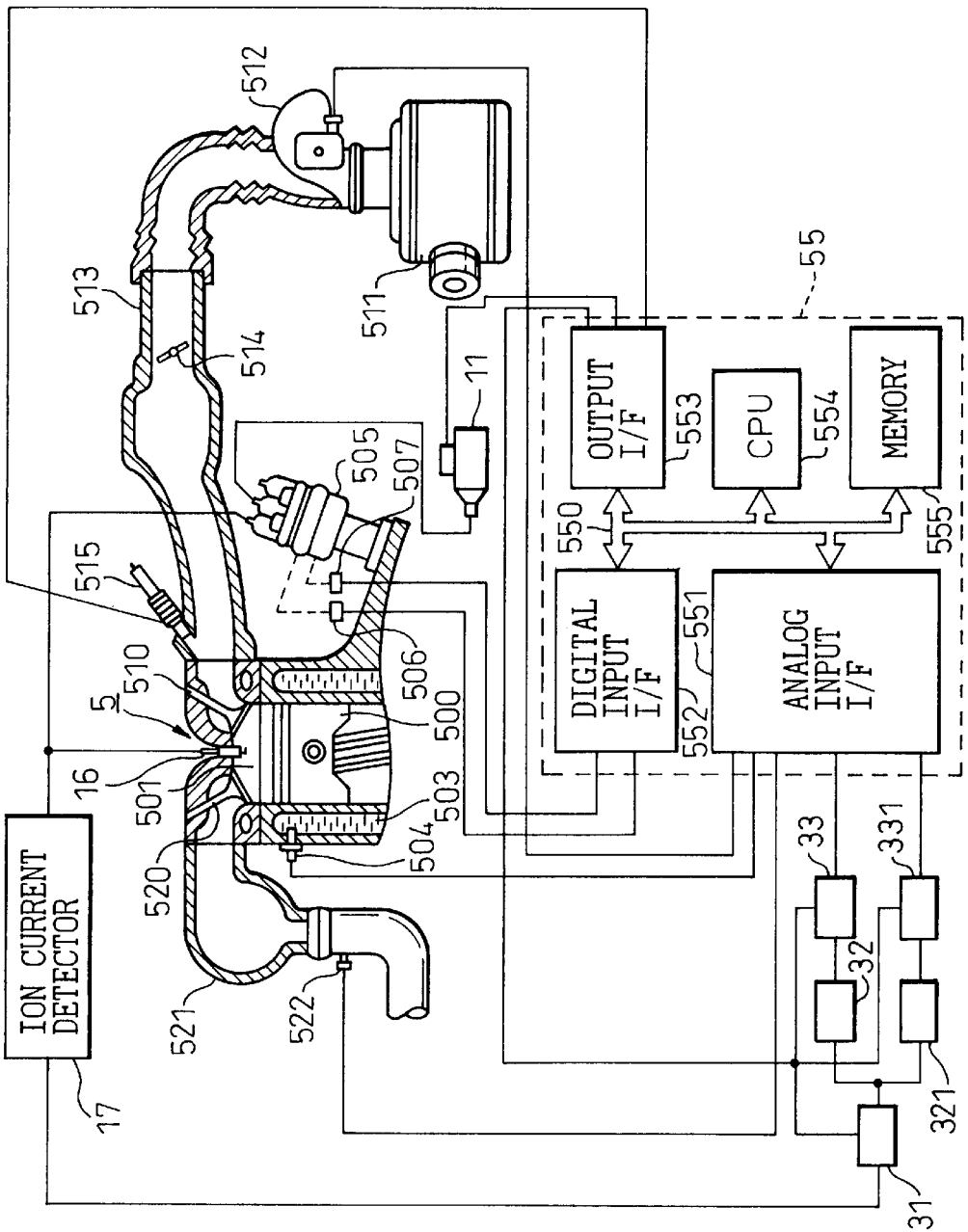

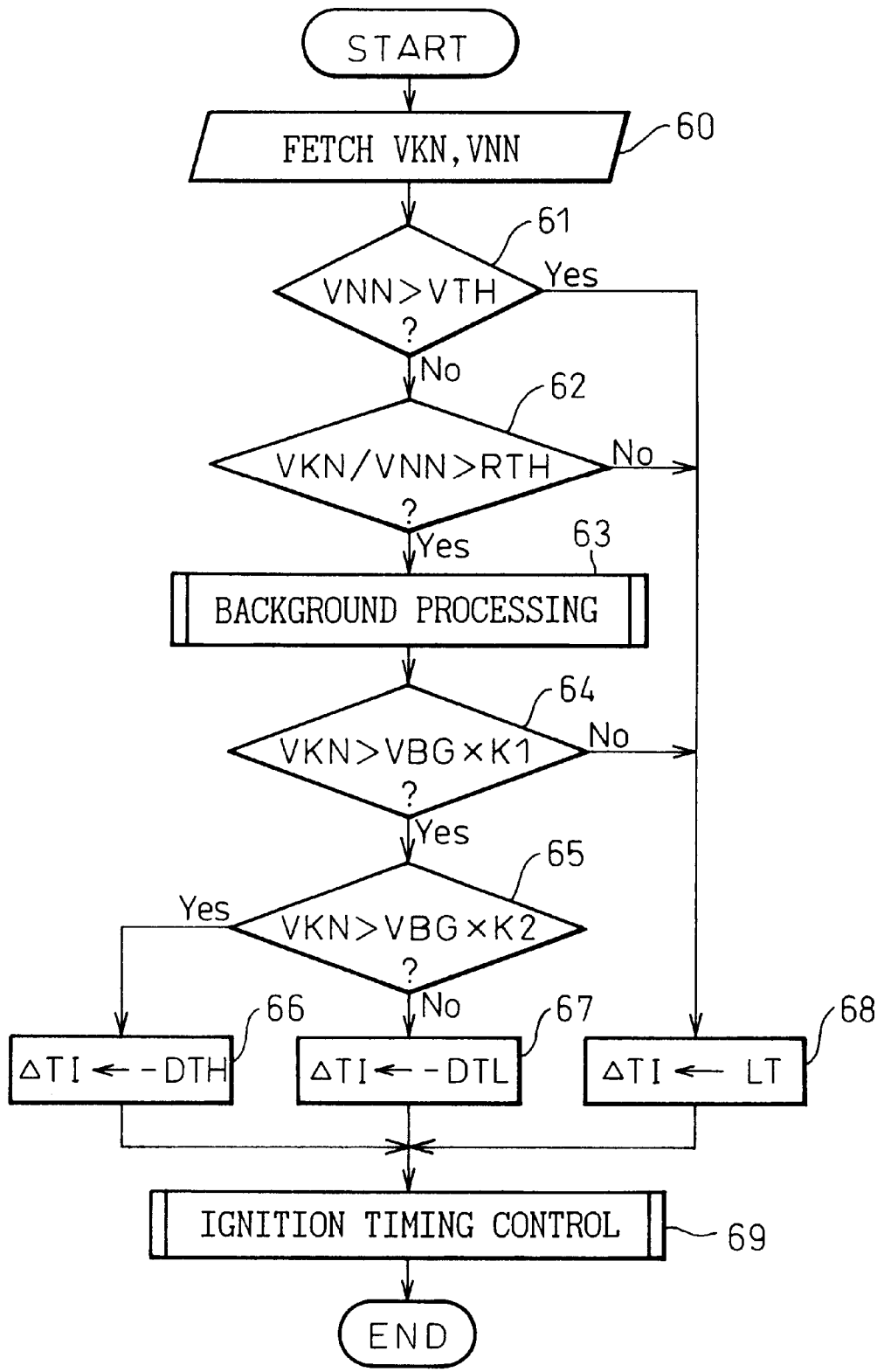

--- ENGINE SPEED LOW
    SPARK ADVANCE SMALL
— ENGIN SPEED HIGH
    SPARK ADVANCE LARGE

TIME

FREQUENCY

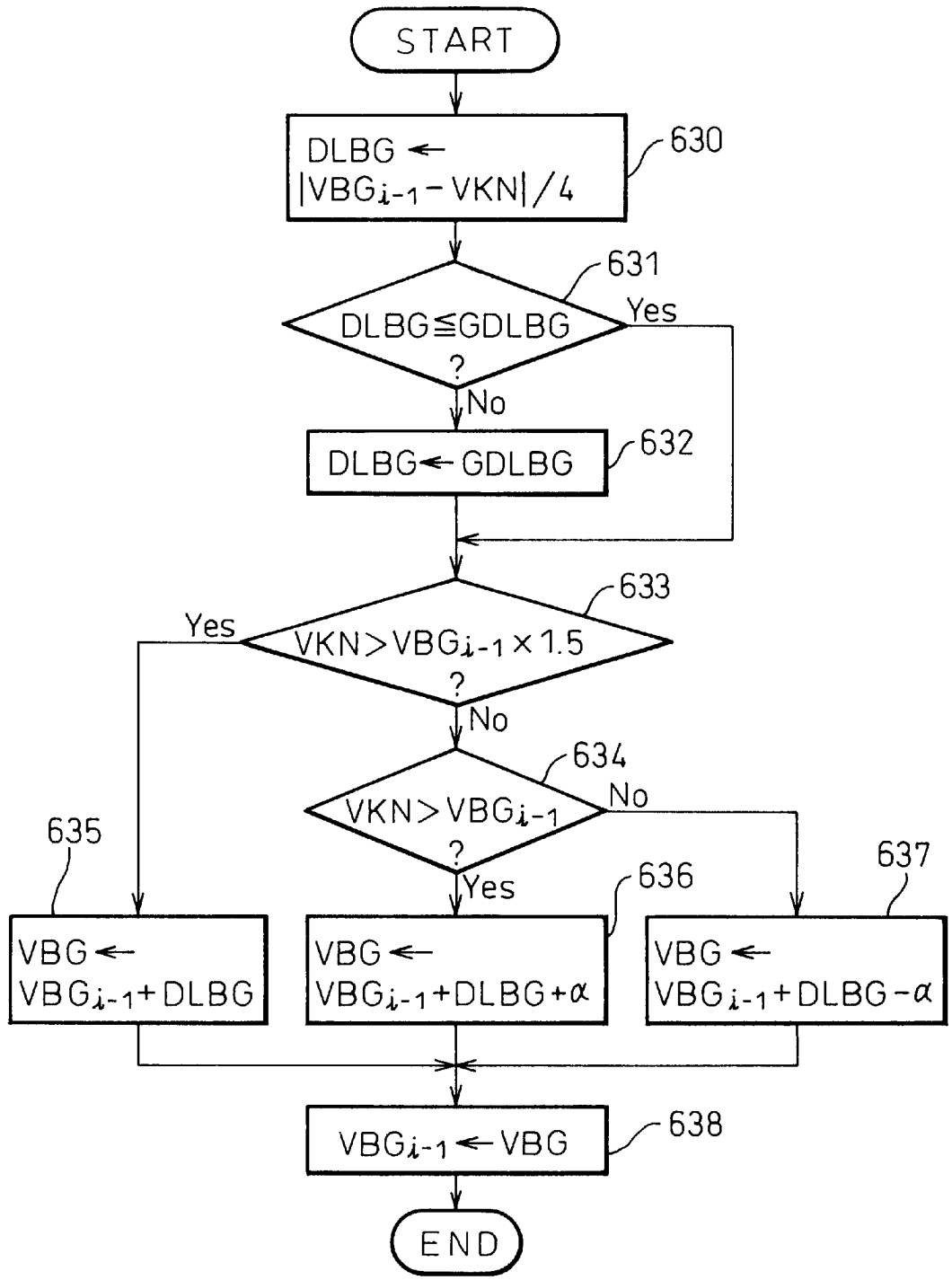

DEVICE FOR DETECTING KNOCKING OF AN INTERNAL COMBUSTION ENGINE

BACKGROUND OF THE INVENTION

1. Field of the Invention

The present invention relates to a device for detecting knocking in an internal combustion engine by using ionic current. More particularly, the invention relates to a device for detecting knocking of an internal combustion engine which, even when spike noise or noise due to disturbance of the flame in low-load running are generated, does not erroneously detect it as knocking.

2. Prior Art

In an internal combustion engine using gasoline as a fuel, a gas mixture compressed by a piston is ignited by a spark plug and is burned to produce an output. That is, in normal combustion, a flame nucleus in a gas mixture is formed near the gap of the spark plug, and propagates over the whole combustion chamber.

The ignition timing of the spark plug has an intimate relationship with the output of the internal combustion engine. When the ignition timing is too late, the propagation speed of the flame becomes slow. Therefore, the combustion becomes slow, resulting in a decrease in the combustion efficiency and, hence, in a decrease in the output of the internal combustion engine.

When the ignition timing is too early, on the other hand, the propagation of flame is fast, whereby the maximum pressure of combustion rises and the output of the internal combustion engine increases. When the ignition timing is too early, however, there takes place knocking in which the mixture gas is self-ignited prior to the propagation of the flame, often damaging the internal combustion engine.

That is, it is advantageous to operate the internal combustion engine in a region where the ignition timing is set just before the occurrence of knocking (MBT: minimum spark advance for best torque) from the standpoint of fuel efficiency and output. It is very important to reliably detect the occurrence of knocking.

A knock sensor which is a vibration sensor has heretofore been used for detecting knocking. However, a device has also been studied which detects knocking by utilizing the phenomenon that ions are generated in the combustion chamber due to the combustion of the mixture gas and an ionic current flows.

FIG. 1 is a diagram schematically illustrating an ignition circuit for an internal combustion engine, wherein an end of a primary coil 111 of an ignition coil 11 is connected to the positive electrode of a battery 12. The other end is grounded via the collector and the emitter of a switching transistor 13 included in an igniter.

The base of the transistor 13 is connected to an ignition timing control unit 14, so that the transistor 13 is turned on when an ignition signal IGT is output from the ignition timing control unit 14.

An end of a secondary coil 112 of the ignition coil 11 is also connected to the positive electrode of the battery 12, and the other end is connected to a spark plug 16 through a reverse current-preventing diode 15, a distributor (not shown) and a high-tension cable 18.

An ionic current detecting unit 17 is connected to the cathode of a reverse current-preventing diode 15 in parallel with the spark plug 16.

The ionic current is supplied, through a protection diode 171, to a series circuit of a current-to-voltage conversion resistor 172 and a bias power source 173. A voltage generated at a point where the current-to-voltage conversion resistor 172 and the protection diode 171 are connected together, is applied to an amplifier circuit 175 comprised of an operational amplifier and a resistor through a capacitor 174 for removing a DC component.

Therefore, a voltage signal proportional to the AC component of the ionic current is output at an output terminal 176 of the ionic current detecting unit 17.

FIGS. 2A to 2E are diagrams of waveforms at each of the portions of the ignition circuit (FIG. 1) and show, respectively, an ignition signal IGT, a voltage on the grounding side of the primary coil (point P), a voltage on the high-tension side of the secondary coil (point S), and a voltage of an amplifier circuit (point I). The abscissa represents time.

When the ignition signal IGT turns to the "H" level and the transistor 13 is turned on at $t_1$, the voltage at point P drops. Immediately after $t_1$, a negative high-voltage pulse is generated at point S, that is, on the high-tension side of the secondary coil. However, the current is blocked by the reverse current-preventing diode 15 from flowing into the spark plug 16 and the ionic current detecting unit 17.

When the ignition signal IGT turns to the "L" level at $t_2$ and the transistor 13 is cut off, the voltage at point P abruptly rises, and a positive high-voltage pulse is generated at point S.

The positive high-tension pulse is not blocked by the reverse current-preventing diode 15 and flows into the spark plug 16 to be discharged. It is prevented by the protection diode 171 from flowing into the ionic current detecting unit 17.

Furthermore, from $t_3$ to $t_4$ after the discharge of the spark plug 16, LC resonance is triggered by energy remaining in the ignition coil 11 due to parasitic inductance and parastic capacitance of the high-tension cable 18 and the like.

The gas mixture in the cylinder is ignited by the discharge of the spark plug 16, ions are generated in the cylinder as the flame spreads, and an ionic current starts flowing. The ionic current increases with an increase in the pressure in the cylinder and decreases with a decrease in the pressure in the cylinder.

When knocking occurs in the internal combustion engine, knocking signals in a particular frequency band (about 6 KHz) are superposed while the ionic current decreases after having reached its peak.

In order to detect the knocking using the ionic current, therefore, it is desired to detect only the knocking signals in a particular frequency band and reject other signals (e.g., LC resonance waves). For this purpose, therefore, it is desired to provide a knocking window which opens at $t_5$ after spurious signals disappear and closes at a suitable moment (e.g., ATDC 60°) after the ionic current has decreased, and to detect the knocking based upon the output of the ionic current detecting unit 17 while the knocking window is opened.

FIG. 3 is a diagram illustrating the constitution of a device for detecting knocking by using an ionic current. The output of the ionic current detecting unit 17 is supplied to a processing unit 34 through a band-pass filter (BPF) unit 32 and an integration (or peak-holding) unit 33. The operation of the integration (or peak-holding) unit 33 is controlled by a window which is opened after a predetermined period determined depending upon the engine speed and the load, and is closed at a moment corresponding to about 50° CA.

In order to maintain the accuracy for detecting knocking irrespective of the conditions for detecting the ionic current, "a method of determining abnormal combustion and device therefor" which divides the ionic current signal into one part containing a relatively greater part of knocking frequency components and another part containing relatively smaller part of knocking frequency components, and detects knocking by comparing the ratio of one part to another with a predetermined reference level are already proposed (see Japanese Unexamined Patent Publication (Kokai) No. 61-57830).

However, the spike noise due to corona discharge of the spark plug 16 includes a wide frequency spectrum and affects the knocking frequency. Besides, the noise due to unstable combustion contains frequency components very close to the knocking frequency band. Therefore, it is not possible to accurately detect knocking by simply dividing the ionic current signal into two parts.

FIG. 4 is a diagram explaining the problems, and shows the waveforms of ionic current signals in the time domain and the frequency domain at a high-load normal combustion state, at an intermediate-load normal combustion state, at a state in which the knocking is taking place, at a state in which the spike noise is generated, and at a low-load normal combustion state.

That is, at the high-load and intermediate-load normal combustion states, the ionic current signals slowly increase and slowly decrease in the time domain when the knocking window is being opened. In the frequency domain, therefore, the level increases in the low-frequency side and decreases in the high-frequency side.

When knocking occurs, vibration components of about 6 KHz are superposed on the ionic signal while the knocking window is opened, and a peak appears near 6 KHz in the frequency domain.

When spike noise is generated while the knocking window is being opened, the level of the frequency domain rises as a whole so that it becomes difficult to extract a knocking peak from the ionic signal.

While operating at a low-load, furthermore, the flame in the combustion chamber is disturbed, and noise with a relatively low frequency spectrum is superposed on the ionic current. In the frequency domain, therefore, the level in the low-frequency band rises so that it becomes difficult to separate a knocking peak from the spectra.

The present invention provides a device for detecting knocking of an internal combustion engine, which does not erroneously detect knocking even when a spike noise or a noise due to disturbance in the flame in the low-load zone is generated.

SUMMARY OF THE INVENTION

A device for detecting knocking in an internal combustion engine according to a first invention comprises:

an ionic current detection means which applies a voltage across a pair of electrodes installed in a combustion chamber of the internal combustion engine, and detects the ionic current flowing between the pair of electrodes through ions generated when the gas mixture in the combustion chamber has burned;

a knocking frequency component extracting means for extracting knocking frequency components representing the occurrence of knocking from the output signals of said ionic current detection means;

a low-load noise frequency component extracting means for extracting low-load noise frequency components representing the occurrence of noise due to unstable combustion under the low load running from the output signals of said ionic current detection means;

a means for whether or not knocking is occurring based upon the knocking frequency components extracted by said knocking frequency component extracting means; and a means for preventing determination of the occurrence of knocking by said means for determining occurrence of knocking when the level of low-load noise frequency components extracted by said low-load noise frequency component extracting means is higher than a predetermined threshold level.

According to this device, it is determined whether or not knocking is occurring based upon the signals of the knocking frequency components extracted from the ionic current signals. When the low-load noise frequency components lower than the knocking frequencies extracted from the ionic current signals are higher than a predetermined level, the determination of whether or not knocking is occurring is prevented to prevent erroneous determination of the occurrence of knocking.

BRIEF DESCRIPTION OF THE DRAWINGS

FIG. 1 is a diagram schematically illustrating an ignition circuit in an internal combustion engine;

FIG. 4 is a diagram illustrating the problems;

FIG. 5 is a diagram illustrating the constitution of a device for detecting knocking of an internal combustion engine according to an embodiment of the present invention;

FIG. 6 is a flow chart of a knocking control routine;

FIG. 8 is a flow chart of a background calculation processing; and

DETAILED DESCRIPTION OF THE PREFERRED EMBODIMENTS

Figure 2A:
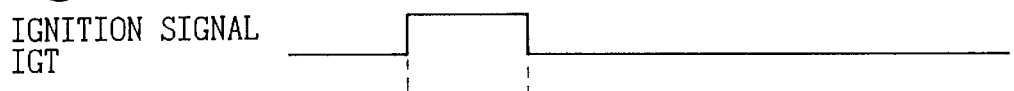
FIGS. 2A to 2E are diagrams of voltage waveforms at each of the portions of the ignition circuit.
Figure 2B:
Figure 2C:
Figure 2D:
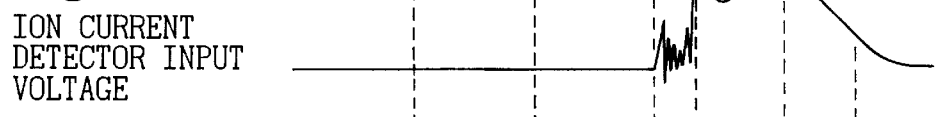
Figure 2E:
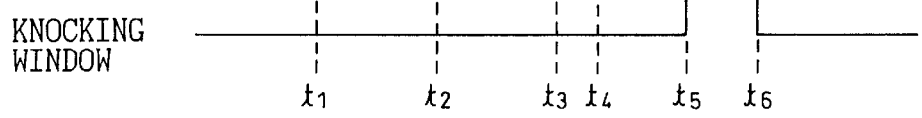
Figure 3:
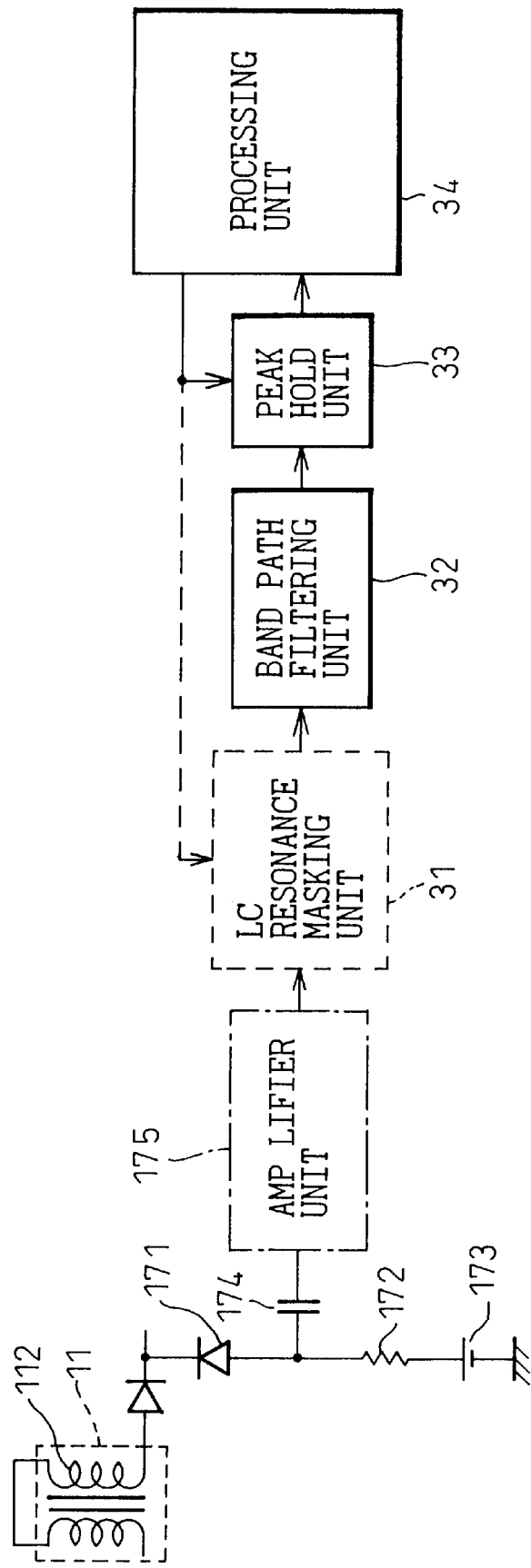
FIG. 3 is a diagram illustrating the constitution of a device for detecting knocking relying upon ionic current.

FIG. 5 is a diagram illustrating the constitution of a device for detecting knocking of an internal combustion engine according to an embodiment of the present invention. A mixture of air taken in through an air cleaner 511 and a fuel injected from a fuel injection valve 515, is supplied into a combustion chamber 501 defined by a piston 500, an intake valve 510 and an exhaust valve 520 in an internal combustion engine 5.

The amount of the intake air is measured by an air flow meter 512, and is adjusted by a throttle valve 514 disposed on an intake pipe 513.

The mixture compressed by the piston 500 is ignited by the electric discharge of a spark plug 16 near the top dead center of the piston 500, and expands to produce a force that pushes down the piston 500.

Exhaust gases after the combustion are exhausted into an exhaust pipe 521 through the exhaust valve 520, and the oxygen concentration in the exhaust gas is detected by an air-to-fuel ratio sensor 522 installed in the exhaust pipe 521.

The temperature of the cooling water for cooling the internal combustion engine 5 is detected by a cooling water temperature sensor 504 inserted in a water jacket 503.

The ionic current flowing in the combustion chamber 501 is guided to the LC resonance masking unit 31 through the spark plug 16 and the ionic current detecting unit 17. The output of the LC resonance masking unit 31 is fed, through the band-pass filter 32 that permits the passage of only those frequency components (6 KHz) specific to the knocking, not only to the peak-holding unit 33 that holds a peak in the output of the band-pass filter 32 but also to a low-load noise peak-holding unit 331 through a low-load noise band-pass filter 321 that permits the passage of only those frequency components (about 4 KHz) specific to the noise caused by unstable combustion during low-load operation. Because the spike noise has a wide frequency spectrum, the output of the low-load noise band-pass filter 321 rises when the spike noise is generated. This means that the spike noise can also be detected by fetching the output of the low-load noise peak-holding unit 331.

The peak-holding unit 33 and the low-load peak-holding unit 331 are connected to a processing unit 55.

The processing unit 55 is a microcomputer system which is constituted by an analog input interface (I/F) 551, a digital input I/F 552, an output I/F 553, a CPU 554, a memory 555 and a bus 550.

That is, the outputs of the peak-holding unit 33 and the low-load noise peak-holding unit 331 are connected to the analog input I/F 551. The air flow meter 512, cooling water temperature sensor 504 and air-to-fuel ratio sensor 522 to the analog input I/F 551 are further connected.

The output I/F 553 outputs a valve opening command to the fuel injection valve 515 and, further, outputs an ignition command signal IGT and an ionic current fetching control signal.

That is, the ignition command signal IGT is boosted through the ignition coil 11, and is sent to the spark plug 16 through the distributor 505. The distributor 505 contains a crank angle sensor 506 which generates a pulse signal every, for example, 30° CA (crank angle) and a reference angle sensor 507 which generates a pulse signal every, for example, 720° CA. Outputs of these sensors are supplied by the processing unit 55 through the digital input I/F 552 and are used for calculating the engine speed Ne, for controlling the timings for opening and closing the fuel injection valve 515 and for controlling the timing for outputting the ignition command signal IGT.

When the LC resonance is taking place, the ionic current fetching control signal turns off the LC resonance masking unit 31 to prevent the LC resonance wave from being fetched, and the ionic current fetching control signal is supplied to the peak-holding unit 33 and to the low-load noise peak-holding unit 331 to permit the operations of the peak-holding unit 33 and the low-load noise peak-holding unit 331 while the knocking window is being opened.

FIG. 6 is a flow chart of a knocking control routine executed by the CPU 554 in the processing unit 55. This routine is executed for every ignition timing operation in each cylinder of the internal combustion engine 5, and the variable is determined for each cylinder.

A peak VKN of the knocking frequency held by the peak-holding unit 33 and a peak VNN of the noise frequency held by the low-load noise peak-holding unit 331 are fetched at step 60.

At step 61, it is determined whether or not the peak VNN of the noise frequency is higher than a predetermined threshold level VTH, i.e., it is determined whether or not a noise frequency component higher than the predetermined level is detected from the ionic current.

When the determination at step 61 is negative, i.e., when a noise frequency component greater than the predetermined level is not detected from the ionic current, the control proceeds to step 62 where it is determined whether or not the ratio (VKN/VNN) of the peak VKN of knocking frequency t the peak VNN of noise frequency is bigger than the predetermined ratio RTH.

Note that the predetermined ratio RTH is determined as a function of the engine speed Ne and the ignition timing TI, and becomes smaller as the engine speed is increased and the ignition timing is advanced.

$$RTH \leftarrow RTH(Ne, TI)$$

The reason why RTH becomes smaller as the engine speed is increased and the ignition timing is advanced is as follows.

Figure 7A:
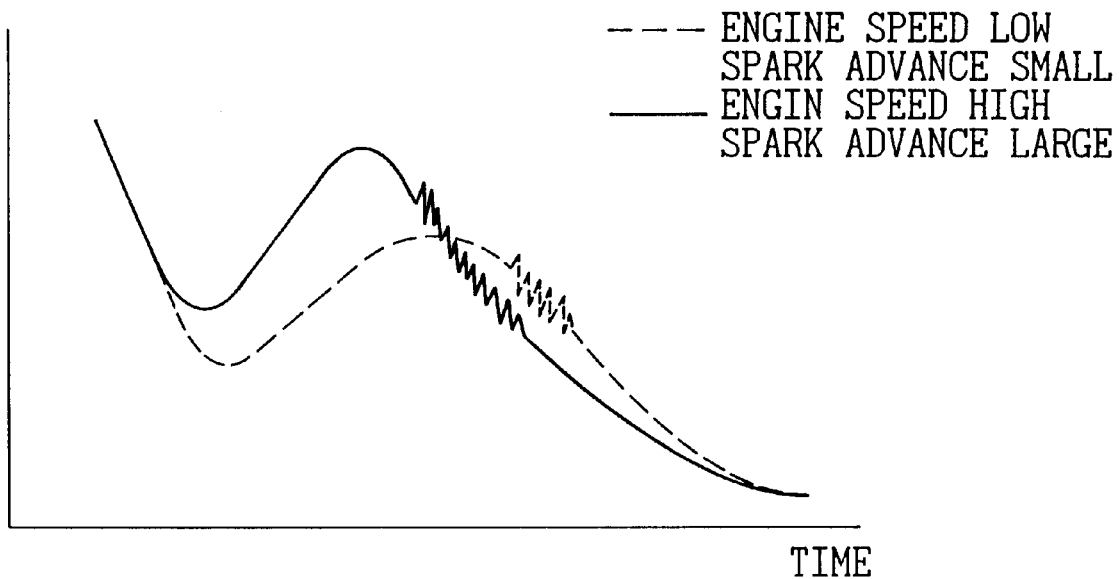
FIGS. 7A and 7B are diagrams illustrating the effects of the engine speed and the ignition timing upon the ionic current signals.
Figure 7B:
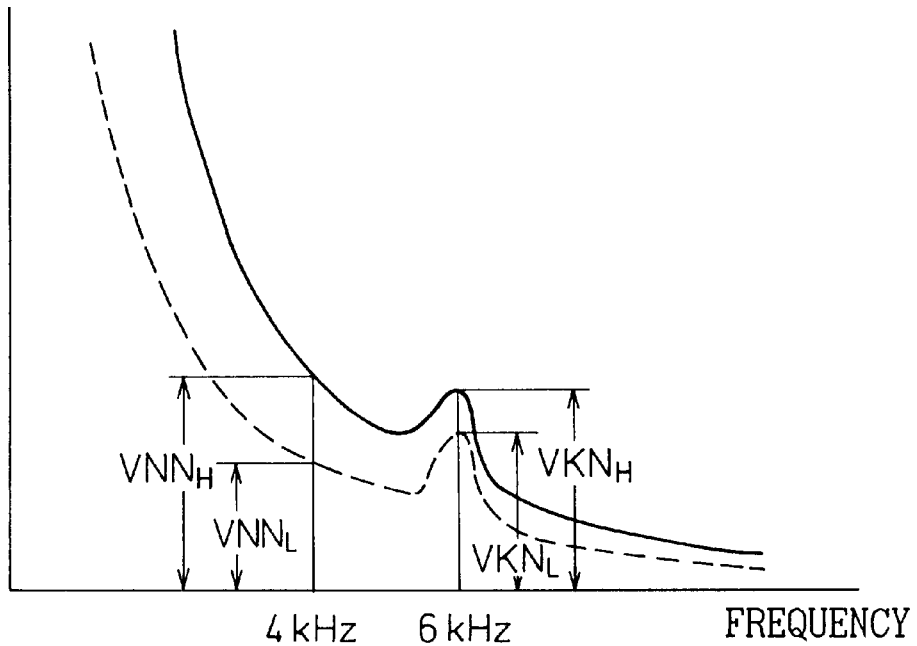

FIGS. 7A and 7B are diagrams illustrating the effects of the engine speed and the ignition timing upon the ionic current signal, wherein FIG. 7A shows the waveform in the time domain and FIG. 7B shows the waveform in the frequency domain. Broken lines represent the effects when the engine speed is low (e.g., 2000 rpm) or when the ignition timing is delayed, and the solid lines represent the effects when the engine speed is high (e.g., 6000 rpm) or when the ignition timing is advanced.

That is, in the time domain, a peak of the ionic current signal that occurs after the gas mixture has been ignited becomes higher and occurs earlier when the engine speed is increased and the ignition timing is advanced. When the knocking occurs, vibration with about 6 KHz is superposed while the ionic current is reduced after it has reached its peak.

In the frequency domain, the level is reduced with an increase in the frequency, and the peak of knocking appears at 6 KHz. If the strength of knocking is the same, the peak at 6 KHz maintains its intensity. The frequency spectrum shifts toward the higher frequencies when the engine speed is increased or the ignition timing is advanced.

Therefore, the ratio $VKN_H/VNN_H$ of the peak $VKN_H$ at 6 KHz to the peak $VNN_H$ at 4 KHz when the engine speed is increased or when the ignition timing is advanced, becomes smaller than the ratio $VKN_L/VNN_L$ when the engine speed is decreased or when the ignition timing is delayed.

When the determination at step 62 is affirmative, the control proceeds to step 63 where the background calculating subroutine is executed because the detection of knocking is allowed. This subroutine will be described later.

At step 64, it is determined whether or not the peak VKN of the ionic current is larger than the background VGB multiplied by a first predetermined coefficient K1. When the determination is affirmative, it is determined at step 65 whether or not the peak VKN of the ionic current is larger than the background VBG multiplied by a second predetermined coefficient K2. It is assumed that, 0<K1<K2.

When the determination at step 65 is affirmative, i.e., when the level of knocking is high, an ignition timing correction factor ΔTI is set to a predetermined large delay angle (−DTH) at step 66, and the control proceeds to step 69.

When the determination at step 65 is negative, i.e., when it is determined that the level of knocking that is taking place is low, the ignition timing correction factor ΔTI is set to a predetermined small delay angle (−DTL) at step 67, and the control proceeds to step 69.

When the determination at step 61 is affirmative or when the determination at step 62 is negative, the noise frequency components are so great that the knocking frequency components may be buried therein, and the occurrence of knocking may not be properly detected. In this case, it is regarded that knocking is not occurring, and the ignition timing correction factor ΔTI is set to a predetermined advancing angle LT at step 68, and the control proceeds to step 69.

When the determination at step 64 is negative, i.e., when it is determined that the knocking is not really taking place, the control proceeds to step 68.

It is assumed that 0<LT<DTL<DTH. This is so that when no knocking is occurring, the ignition timing is gradually advanced and when knocking occurs, the ignition timing is delayed by a large amount to suppress the knocking. In this embodiment, furthermore, the angle is delayed by a very large amount when the level of knocking is high to enhance the effect of suppression.

An ignition timing control subroutine is executed at step 69 to terminate the routine. The ignition timing control subroutine will be described later.

FIG. 8 is a flow chart of a background calculation subroutine executed at step 63 in the knocking control routine. An updated amount DLBG is calculated at step 630 according to the following formula, $$DLBG \leftarrow |VBG_{i-1} - VKN|/4$$

where $VBG_{i-1}$ is a background calculated for the previous time, and the updated quantity DLBG is calculated as a value one-fourth of the absolute value of a difference between the background calculated at the previous execution and a peak value VKN at the present execution.

At steps 631 and 632, the updated amount DLBG is limited to a predetermined upper-limit guard value GDLBG.

At steps 633 and 634, it is determined whether or not the peak value VKN at this execution is larger than the product of a predetermined coefficient (e.g., 1.5) which is larger than 1.0 and $VBG_{i-1}$, smaller than the product and larger than $VBG_{i-1}$, or smaller than $VBG_{i-1}$.

When the peak value VKN is larger than $VBG_{i-1}$ multiplied by the predetermined coefficient, the background VBG is updated at step 635 according to the following formula, $$VBG \leftarrow VBG_{i-1} + DLBG$$

When the peak value VKN is smaller than $VBG_{i-1}$ multiplied by predetermined coefficient but is larger than $VBG_{i-1}$, the background VBG is updated at step 636 according to the following formula, $$VBG \leftarrow VBG_{i-1} + DLBG + \alpha$$

When the peak value VKN is smaller than $VBG_{i-1}$, the background VBG is updated at step 637 according to the following formula, $$VBG \leftarrow VBG_{i-1} + DLBG - \alpha$$

where α is an adjustment coefficient for setting the background VBG to be limited within a suitable range.

Finally, at step 638, the $VBG_{i-1}$ is set to the background VBG calculated at this execution to be ready for the operation of the next execution, and this subroutine is terminated.

Figure 9:
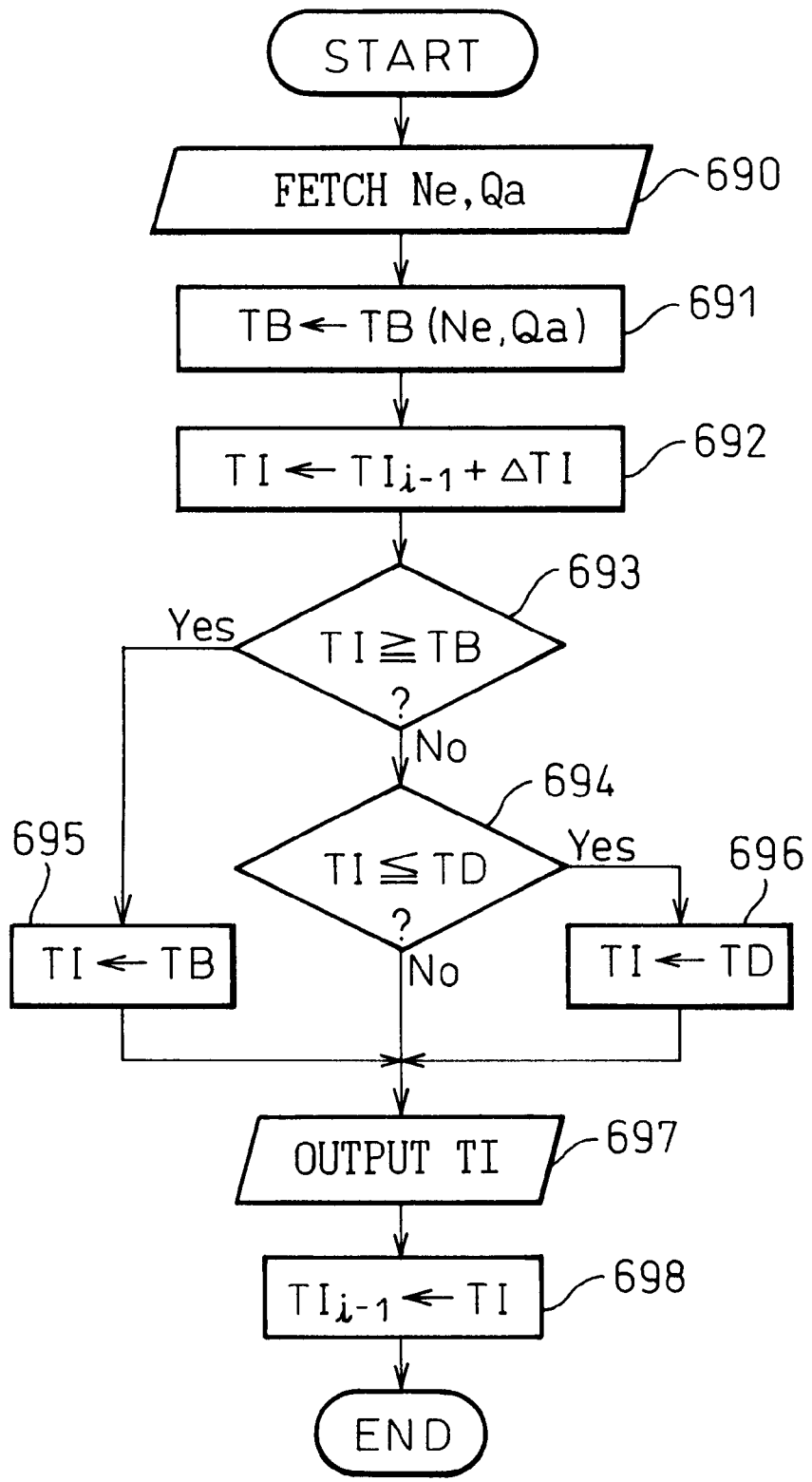
FIG. 9 is a flow chart of an ignition timing control processing.

FIG. 9 is a flow chart of the ignition timing control processing executed at the step 69 in the knocking control routine. The engine speed Ne determined depending upon a pulse output from the crank angle sensor 506 and the intaken air amount Qa detected by the air flow meter 512, are fetched at step 690, and a reference ignition timing TB is calculated at step 691 as a function of the engine speed Ne and the intaken air amount Qa according to the following formula, $$TB \leftarrow TB(Ne, Qa)$$

At step 692, the ignition timing correction value ΔTI is added to the ignition timing $TI_{i-1}$ calculated in the previous execution, to calculate the ignition timing TI of this execution, $$TI \leftarrow TI_{i-1} + \Delta TI$$

In this embodiment, the ignition timing is advanced when a positive number is added and is delayed when a positive number is subtracted.

At steps 693 and 694, it is determined whether or not the ignition timing TI of this execution is between the reference ignition timing TB which is the maximum advanced ignition timing and a predetermined maximum delayed ignition timing TD.

That is, when the ignition timing TI at this execution is more advanced than the reference ignition timing TB, the determination at step 693 is affirmative, the ignition timing TI at this execution is replaced by the reference ignition timing TB at step 695, and the control proceeds to step 697.

Conversely, when the ignition timing TI at this execution is more delayed than the maximum delayed ignition timing TD, the determination at step 694 is negative, the ignition timing TI at this execution is replaced by the maximum delayed ignition timing TD at step 696, and the control proceeds to step 697. When the ignition timing TI at this execution is between the reference ignition timing TB and the maximum delayed ignition timing TD, the control directly proceeds to step 697.

At step 697, the ignition command signal IGT is output to the ignition coil 11 through the output I/F 553, the ignition timing $TI_{i-1}$ calculated at the previous execution is updated to the ignition timing TI at this execution to be ready for the calculation of the next execution, and this subroutine is terminated.

In the above-mentioned embodiment, the device for detecting knocking in an internal combustion engine is constituted by hardware circuits including the band-pass filter 32, the peak-holding unit 33, the low-load noise band-pass filter 321 and the low-load noise peak-holding unit 331. However, it is also possible to supply the outputs of the LC resonance masking unit 31 directly to the computer, to analyze the frequency by using FFT algorithms and the like, and to divide the outputs into noise components and knocking components based upon a frequency spectral pattern.

We claim:

1. A device for detecting knocking in an internal combustion engine comprising:

ionic current detection means which applies a voltage across a pair of electrodes installed in a combustion chamber of the internal combustion engine and detects an ionic current flowing between the pair of electrodes through ions generated when mixture gas in the combustion chamber is burned;

knocking frequency component extracting means for extracting from the detected ionic current knocking frequency components representing an occurrence of knocking;

means for extracting from the detected ionic current low-load noise frequency components representing noise occurring due to unstable combustion under low load running means for determining the occurrence of knocking for determining whether knocking is occurring based upon the knocking frequency components extracted by the knocking frequency component extracting means; and means for preventing, when the level of extracted low-load noise components is higher than a first predetermined threshold level, the determination of the occurrence of knocking by the means for determining the occurrence of knocking.

2. A device according to claim 1, wherein the means for determining occurrence of knocking determines that knocking is occurring when the level of the knocking frequency components extracted by the knocking frequency component extracting means is larger than a second predetermined threshold level and when a ratio of the knocking frequency components extracted by the knocking frequency component extracting means to the level of low-load noise frequency components extracted by the low-load noise frequency extracting means, is larger than a predetermined reference value.

3. A device according to claim 2, wherein the reference value becomes smaller when the engine speed is increased and the ignition timing is advanced.

4. A method of detecting knocking in an internal combustion engine comprising the steps of:

applying a voltage across a pair of electrodes installed in a combustion chamber of the internal combustion engine and detecting an ionic current flowing between the pair of electrodes through ions generated when a gas mixture in the combustion chamber is burned;

extracting from the detected ionic current knocking frequency components representing an occurrence of knocking;

extracting from the detected ionic current low-load noise frequency components representing noise occurring due to unstable combustion under low load running;

determining the occurrence of knocking based upon the knocking frequency components extracted at the knocking frequency component extracting step; and prohibiting, when the level of extracted low-load noise components is higher than a first predetermined threshold level, the determination of the occurrence of knocking by the step for determining the occurrence of knocking.

5. A method according to claim 4, wherein the step for determining the occurrence of knocking determines that knocking is occurring when the level of the knocking frequency components extracted by the step for extracting the knocking frequency components is larger than a second predetermined threshold level and when a ratio of the knocking frequency components extracted by the knocking frequency component extracting means to the level of low-load noise frequency components extracted by the low-load noise frequency extracting step, is larger than a predetermined reference value.

* * * * *

UNITED STATES PATENT AND TRADEMARK OFFICE
CERTIFICATE OF CORRECTION

PATENT NO. : 5,900,536
DATED : May 4, 1999
INVENTOR(S) : Kazuhisa MOGI, et al.

It is certified that error appears in the above-identified patent and that said Letters Patent is hereby corrected as shown below: Title pate, item [57]
In the ABSTRACT, delete all the numbers.

Column 4, line 4, between "for" and "whether" insert --determining occurrence of knocking for determining--.

Column 6, line 9, change "t" to --to-- at beginning of line.

Column 8, line 67, change "running" to --running;--.

Signed and Sealed this

Fourteenth Day of March, 2000

Attest:

Q. TODD DICKINSON

Attesting Officer

Commissioner of Patents and Trademarks